United States Patent
Xiong et al.

(10) Patent No.: US 11,279,045 B2
(45) Date of Patent: Mar. 22, 2022

(54) ROBOT POSE ESTIMATION METHOD AND APPARATUS AND ROBOT USING THE SAME

(71) Applicant: UBTECH ROBOTICS CORP LTD, Shenzhen (CN)

(72) Inventors: Youjun Xiong, Shenzhen (CN); Jianxin Pang, Shenzhen (CN); Wanli Zhang, Shenzhen (CN); Jingtao Zhang, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 384 days.

(21) Appl. No.: 16/556,233

(22) Filed: Aug. 30, 2019

(65) Prior Publication Data
US 2020/0206945 A1    Jul. 2, 2020

(30) Foreign Application Priority Data
Dec. 29, 2018   (CN) .......................... 201811636352.0

(51) Int. Cl.
*B25J 9/16*   (2006.01)
*B25J 13/08*  (2006.01)
*B25J 19/02*  (2006.01)

(52) U.S. Cl.
CPC ........... *B25J 13/089* (2013.01); *B25J 9/1664* (2013.01); *B25J 19/022* (2013.01)

(58) Field of Classification Search
CPC ....... B25J 13/089; B25J 9/1664; B25J 19/022
USPC ................................ 700/258, 254; 901/2, 30
See application file for complete search history.

(56) References Cited

U.S. PATENT DOCUMENTS

| | | | |
|---|---|---|---|
| 2015/0269438 A1* | 9/2015 | Samarasekera | G06K 9/00637 382/154 |
| 2017/0123066 A1* | 5/2017 | Coddington | G01C 15/002 |
| 2018/0188032 A1* | 7/2018 | Ramanandan | G01C 21/165 |
| 2020/0024853 A1* | 1/2020 | Furrer | B25J 15/0019 |

FOREIGN PATENT DOCUMENTS

| CN | 105628026 A | 6/2016 |
|---|---|---|
| CN | 107246868 A | 10/2017 |

* cited by examiner

*Primary Examiner* — Dalena Tran

(57) ABSTRACT

The present disclosure relates to robot technology, which provides a robot pose estimation method as well as an apparatus and a robot using the same. The method includes: obtaining, through an inertial measurement unit, initial 6DoF pose data; performing a first correction on the initial 6DoF pose data based on pose data obtained through an auxiliary sensor to obtain corrected 6DoF pose data; obtaining, through a 2D lidar sensor disposed on a stable platform, 3DoF pose data; and performing a second correction on the corrected 6DoF pose data based on the 3DoF pose data to obtain target 6DoF pose data. In this manner, the accuracy of the pose data of the robot is improved, and the accurate pose estimation of the robot is realized.

19 Claims, 6 Drawing Sheets

ROBOT POSE ESTIMATION METHOD AND APPARATUS AND ROBOT USING THE SAME

CROSS REFERENCE TO RELATED APPLICATIONS

This application claims priority to Chinese Patent Application No. 201811636352.0, filed Dec. 29, 2018, which is hereby incorporated by reference herein as if set forth in its entirety.

BACKGROUND

1. Technical Field

The present disclosure relates to robot technology, and particularly to a robot pose estimation method as well as an apparatus and a robot using the same.

2. Description of Related Art

The pose estimation capability for path planning and motion control is essential for a robot to realize autonomous navigation, and is of great significance for improving the automation level of the robot.

Currently, the most common robot pose estimation method is to estimate by using an inertial measurement unit (IMU). Since the sensors in the inertial measurement unit (IMU) obtain the angular velocity and displacement acceleration of the robot which need to be integrated to obtain the position and velocity of the robot. However, because the sensor has a noise offset, the position and velocity obtained by integrating will have integral drifts, and it is impossible to accurately estimate the pose of the robot.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

In order to explain the technical solutions described in the present disclosure, the following provides a description through specific embodiments.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular form "the" is intended to include the plural forms as well, unless the context clearly indicates otherwise.

Figure 1:
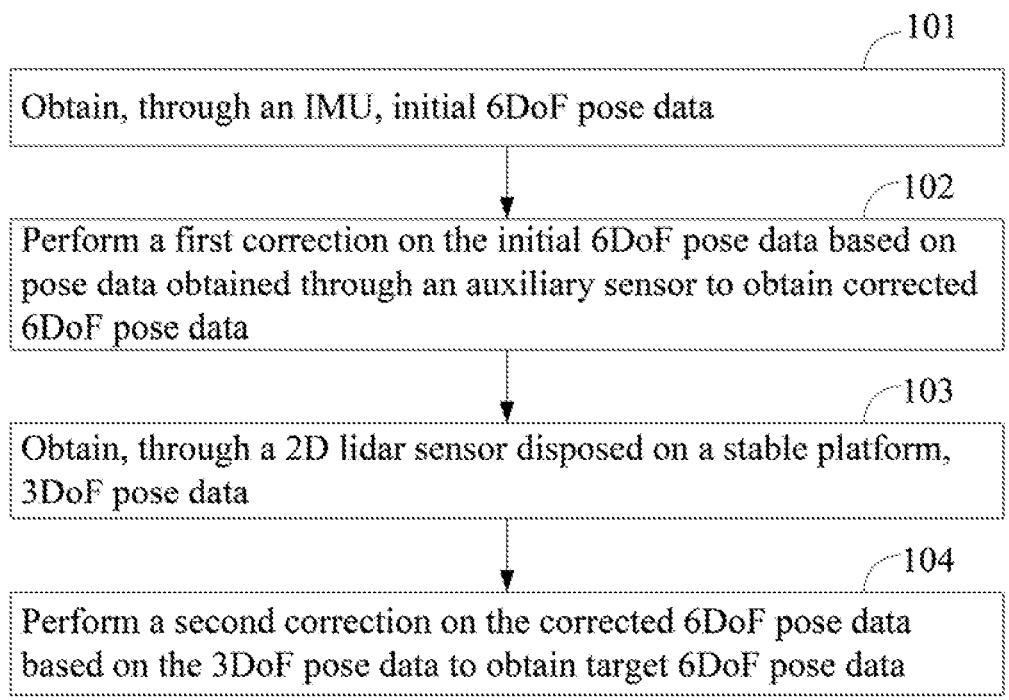
FIG. 1 is a flow chart of a robot pose estimation method according to an embodiment of the present disclosure.

FIG. 1 is a flow chart of a robot pose estimation method according to an embodiment of the present disclosure. In this embodiment, a robot pose estimation method for a robot having an inertial measurement unit (IMU), an auxiliary sensor, and a 2D lidar sensor is provided. The method is a computer-implemented method executable for a processor, which may be implemented through and applied to a robot pose estimation apparatus shown in FIG. 5 or a robot shown in FIG. 6, or implemented through a computer readable storage medium. As shown in FIG. 1, the method includes the following steps.

Step 101: obtaining, through the IMU, initial 6DoF (six degrees of freedom) pose data.

An object has six degrees of freedom in a space, that is, the degrees of freedom of moving along three Cartesian coordinate axes of x, y, and z and the degrees of freedom of rotating about the three coordinate axes. Hence, to completely determine the position of the object, these six degrees of freedom has to be obtained.

The IMU is a device for detecting the three-axis angular velocity and acceleration of an object. In general, one IMU includes three single-axis accelerometers and three single-axis gyroscopes. The accelerometers detect the accelerations of the object in the three independent axis of a coordinate system of a carrier, while the gyroscopes detect the angular velocities of the carrier with respect to a navigational coordinate system. It detects the angular velocities and the accelerations of the object in a three-dimensional space, thereby calculating the pose (i.e., the position and the posture) of the object. Therefore, when performing the pose estimation of the robot, the IMU can be used to obtain the initial 6DoF pose data of the robot. In this embodiment, pose data includes data for a pose of the robot, where the pose of the robot includes a position of the robot and a posture of the robot. The 6DoF pose data includes pose data in six degrees of freedom.

Step 102: performing a first correction on the initial 6DoF pose data based on pose data obtained through the auxiliary sensor to obtain corrected 6DoF pose data.

In this embodiment, since the sensors of the IMU have a noise offset, the position and the velocity of robot that are obtained by integrating may have integral drifts, the accurate pose estimation of the robot cannot be realized. Therefore, it needs to perform the first correction on the initial 6DoF pose data by using the pose data obtained through the auxiliary sensor so as to obtain the corrected 6DoF pose data.

In one example, the auxiliary sensor may include one or more of a global positioning system (GPS), a barometer, a magnetometer, a visual measuring instrument, or the like that can realize the detection of the pose data. In other embodiments, the auxiliary sensor may also include other sensors.

Figure 2:
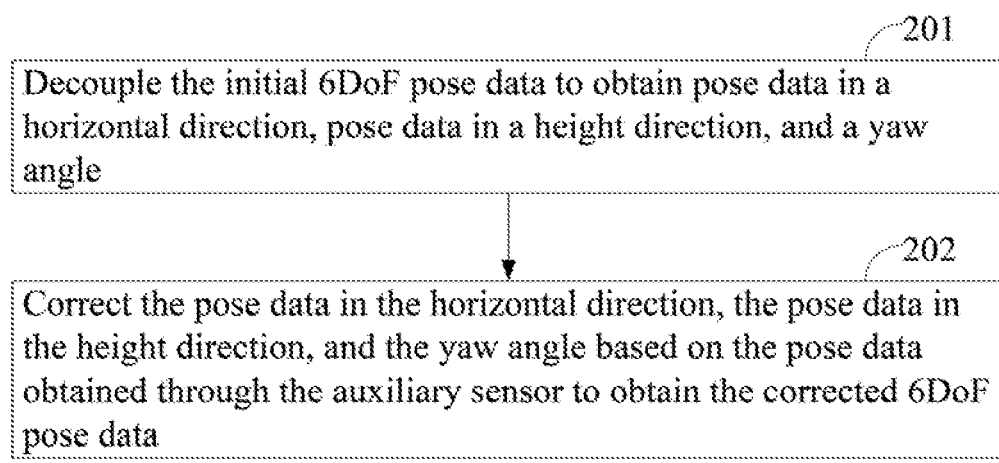
FIG. 2 is a flow chart of an example of step 102 in the method of FIG. 1.

FIG. 2 is a flow chart of an example of step 102 in the method of FIG. 1. As shown in FIG. 2, step 102 of the method of FIG. 1 may include the following steps.

Step 201: decoupling the initial 6DoF pose data to obtain pose data in a horizontal direction, pose data in a height direction, and a yaw angle.

Figure 3:
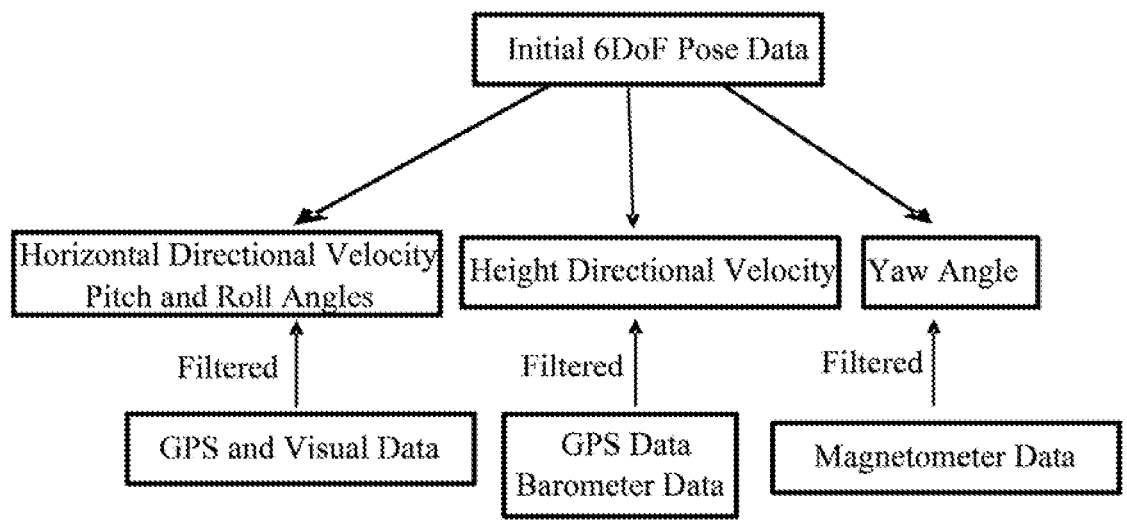
FIG. 3 is a schematic diagram of decoupling the 6DoF pose data in the method of FIG. 1.

After the initial 6DoF pose data is decoupled, the pose data in the horizontal direction, the pose data in the height direction, and the yaw angle can be obtained. FIG. 3 is a schematic diagram of decoupling the 6DoF pose data in the method of FIG. 1. As shown in FIG. 3, the pose data in a horizontal direction includes: a velocity in a X-axis direction, a velocity in a Y-axis direction, a pitch angle of rotating about the X-axis, and a roll angle of rotating about the Y-axis; the pose data in a height direction includes a velocity in a Z-axis direction; and the yaw angle is an angle of rotating about the Z-axis In which, the decoupling method can be implemented by using a general decoupling technique. For instance, the decoupling of the initial 6DoF pose data can be realized using a Euclidean norm.

In one embodiment, before decoupling the initial 6DoF pose data, the method may include: converting an angular velocity $\omega=(\omega_x,\omega_y,\omega_z)^T$ and an acceleration $a=(a_x,a_y,a_z)^T$ obtained by the IMU in a body coordinate (i.e., a coordinate which moves along with a body of the robot) into an Euler angle $\Omega=(\phi, \theta, \varphi)^T$, a position vector $p=(p_x,p_y,p_z)^T$, and a velocity vector $v=(v_x,v_y,v_z)^T$ in a navigation system; and integrating the Euler angle $\Omega=(\phi, \theta,\varphi)^T$, the position vector $p=(p_x,p_y,p_z)^T$, and the velocity vector $v=(v_x,v_y,v_z)^T$ to obtain the initial 6DoF pose data.

As an example, the angular velocity $\omega=(\omega_x,\omega_y,\omega_z)^T$ and the acceleration $a=(a_x,a_y,a_z)^T$ obtained by the IMU in the body coordinate can be converted into the Euler angle $\Omega=(\phi,\theta,\varphi)^T$, the position vector $p=(p_x, p_y,p_z)^T$ and the velocity vector $v=(v_x,v_y,v_z)^T$ in the navigation system through a rigid body kinematics equation $$\dot{\Omega} = E_\Omega \cdot \omega$$
$$\dot{p} = v$$
$$\dot{v} = R_\Omega \cdot a + g$$

of the robot, where $R_\Omega$ is a directional cosine matrix for converting any vector from the body coordinate into the navigation system, $E_\Omega$ is a conversion matrix for converting an angular velocity in the body coordinate into an Euler angle derivative, and g is a gravity constant vector.

Step 202: correcting the pose data in the horizontal direction, the pose data in the height direction, and the yaw angle based on the pose data obtained through the auxiliary sensor to obtain the corrected 6DoF pose data.

After decoupling the initial 6DoF pose data to obtain the pose data in the horizontal direction, the pose data in the height direction, and the yaw angle in Step 201, it can correct the pose data in the horizontal direction, the pose data in the height direction, and the yaw angle based on the pose data obtained through the auxiliary sensor to obtain the corrected 6DoF pose data.

As an example, FIG. 3 is a schematic diagram of performing a first correction on an initial 6DoF pose data in the method of FIG. 1. As shown in FIG. 3, the pose data in the horizontal direction that is obtained by the GPS and the visual measuring instrument is used to perform the first correction on the pose data in the horizontal direction that is obtained by decoupling the initial 6DoF pose data; a velocity in the height direction obtained by the GPS and a height obtained by the barometer are used to perform the first correction on the pose data in the height direction that is obtained by decoupling the initial 6DoF pose data; and the yaw angle obtained by the magnetometer is used to perform the first correction on the yaw angle obtained by decoupling the initial 6DoF pose data, and finally the corrected 6DoF pose data is obtained.

Step 103: obtaining, through the 2D lidar sensor disposed on a stable platform, 3DoF pose data.

After the corrected 6DoF pose data is obtained, a second correction can be performed on the corrected 6DoF pose data by obtaining the 3DoF pose data through the 2D lidar sensor disposed on the stable platform, thereby obtaining a target 6DoF pose data that has higher precision.

In this embodiment, since the 3D laser radar sensor is relatively expensive and has a long scanning period, the 3DoF pose data obtained by the 2D lidar sensor is used to perform the second correction on the corrected 6DoF pose data, thereby saving the cost and efficiency of robot pose estimation.

When the 2D lidar sensor is used as the sensor for scanning the position and angle of a plane, it emits laser scanning lines in a certain direction, receives the lasers reflected by obstacles, obtains a time difference from the emission to the reception of the lasers, and calculates a distance of the closest obstacle in the direction based on the time difference, thereby realizing the positioning of the robot itself, that is, obtaining the position (a coordinate on the X-axis and the Y-axis) and the course angle of the robot on the plane. Since the robot may have a large amplitude of pitches and rolls on some uneven grounds, in order to ensure that the 2D lidar sensor can perform the scanning on the Z plane as good as possible, it needs to isolate the 2D lidar sensor from the pitches and rolls when the robot is moved on uneven grounds, thereby ensuring the stableness of the stable platform.

In which, the stable platform refers to a platform that does not shake with the jitter of the robot. The isolation method may include: calculating a control amount of the stable platform based on the corrected 6DoF pose data, and controlling an actuator to drive the stable platform to move in a reverse direction according to the control amount to keep the stable platform stable. In such a manner, the platform can remain stable.

As an example, the control amount of the stable platform is calculated by obtaining the pitch angle of rotating about the X-axis, the roll angle of rotating about the Y-axis, and the angular velocity, so as to control the actuator to drive the stable platform to move in the reverse direction according to the control amount to keep the stable platform stable, thereby obtaining the more accurate 3DoF pose data obtained by the 2D lidar sensor.

Figure 4:
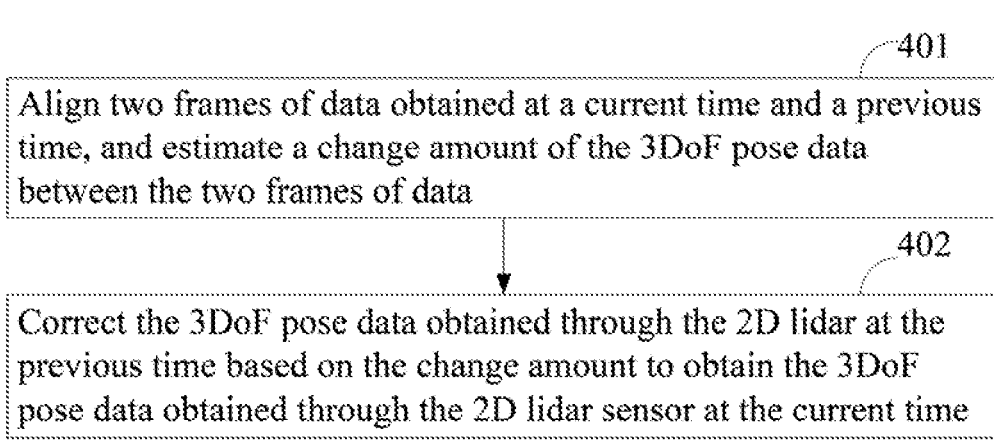
FIG. 4 is a flow chart of an example of step 103 in the method of FIG. 1.

FIG. 4 is a flow chart of an example of step 103 in the method of FIG. 1. As shown in FIG. 4, step 103 of the method of FIG. 1 may include the following steps.

Step 401: aligning two frames of data obtained at a current time and a previous time, and estimating a change amount of the 3DoF pose data between the two frames of data.

Step 402: correcting the 3DoF pose data obtained through the 2D lidar at the previous time based on the change amount to obtain the 3DoF pose data obtained through the 2D lidar sensor at the current time.

In this embodiment, the estimating the change amount of the 3DoF pose data between the two frames of data includes: estimating the change amount of the 3DoF pose data between the two frames of data by using a Gauss-Newton iteration method, for example:

obtaining a rigid body pose $\xi=[p_x^T p_y^T \psi]^T$ of the current time to solve an equation of $$\xi^* = \arg\min_{\xi} \sum_{i=1}^{n} [1 - M(S_i(\xi))]^2;$$

where the function $S_i(\xi)$ is the value of a scan end point $S_i=(S_{i,x}, S_{i,y})^T$ in the world coordinate system, which is the function of the 3DoF pose $\xi$ that has a form of:

$$S_i(\xi) = \begin{pmatrix} \cos(\psi) & -\sin(\psi) \\ \sin(\psi) & \cos(\psi) \end{pmatrix} \begin{pmatrix} s_{i,x} \\ s_{i,y} \end{pmatrix} + \begin{pmatrix} p_x \\ p_y \end{pmatrix};$$

the function $M(S_i(\xi))$ returns the value (0 or 1) at an coordinate $S_i(\xi)$ on an occupancy grid map. After the initial estimated pose $\xi$ is given, a pose correction amount $\Delta\xi$ for solving the equation has to be met:

$$\sum_{i=1}^{n} [1 - M(S_i(\xi + \Delta\xi))]^2 \to 0;$$

through the first-order Taylor expansion, it can get:

$$\sum_{i=1}^{n} \left[ 1 - M(S_i(\xi)) - \nabla M(S_i(\xi)) \frac{\partial S_i(\xi)}{\partial \xi} \Delta\xi \right]^2 \to 0;$$

the solution of the above equation can be obtained through Gauss-Newton equation:

$$\Delta\xi = H^{-1} \sum_{i=1}^{n} \nabla M(S_i(\xi)) \frac{\partial S_i(\xi)}{\partial \xi} [1 - M(S_i(\xi))];$$

where, the H array is $$H = \left[ \nabla M(S_i(\xi)) \frac{\partial S_i(\xi)}{\partial \xi} \right]^T \left[ \nabla M(S_i(\xi)) \frac{\partial S_i(\xi)}{\partial \xi} \right].$$

Through the above-mentioned equation, the change amount of the pose between two subsequent frames of scanning data can be obtained.

Step 104: performing a second correction on the corrected 6DoF pose data based on the 3DoF pose data to obtain target 6DoF pose data.

In one embodiment, step 104 may include:
using the following correction equation to perform the second correction on the corrected 6DoF pose data:

$$(P^+)^{-1} = (1-\omega)P^{-1} + \omega \cdot C^T R^{-1} C$$

$$\hat{x}^+ = P^+((1-\omega)P^{-1}\hat{x} + \omega \cdot C^T R^{-1} \xi^+)^{-1};$$

where, $\hat{x}$ is the corrected 6DoF pose data, P is a variance matrix corresponding to the corrected 6DoF pose data, and $\xi^+$ is the 3DoF pose data, R is a variance matrix corresponding to the corrected 3DoF pose data, C is an observation projection matrix for projecting the corrected 6DoF pose data $\hat{x}$ onto a scan plane of the 2D lidar sensor, and $\omega$ is a correction weight.

In practical application scenarios, the variance matrix P, the variance matrix R, and the observation projection matrix C can be calculated based on the parameters of the sensors.

In one embodiment, the correction equation may also be expressed as:

$$P^+ = P - (1-\omega)^{-1} KCP$$

$$\hat{x}^+ = \hat{x} + K(\xi^* - C\hat{x})$$

$$K = PC^T \left( \frac{(1-\omega)}{\omega} R + C^T PC \right)^{-1};$$

where K is a filter gain.

In this embodiment, the first correction is performed on the initial 6DoF pose data obtained through the inertial measurement unit based on the pose data obtained through the auxiliary sensor to obtain the corrected 6DoF pose data, and the second correction is performed on the corrected 6DoF pose data based on the 3DoF pose data obtained through the 2D lidar sensor disposed on the stable platform to obtain the target 6DoF pose data, so that the eventually obtained 6DoF pose data is the pose data after two corrections, which improves the accuracy of the pose data of the robot, and realizes the accurate pose estimation of the robot.

The present disclosure also provides a robot pose estimation apparatus including modules for performing the steps in the above-mentioned robot pose estimation method. The apparatus can be integrated into the above-mentioned robot. For details of the apparatus that are not described herein, please refer to the description of the above-mentioned method.

Figure 5:
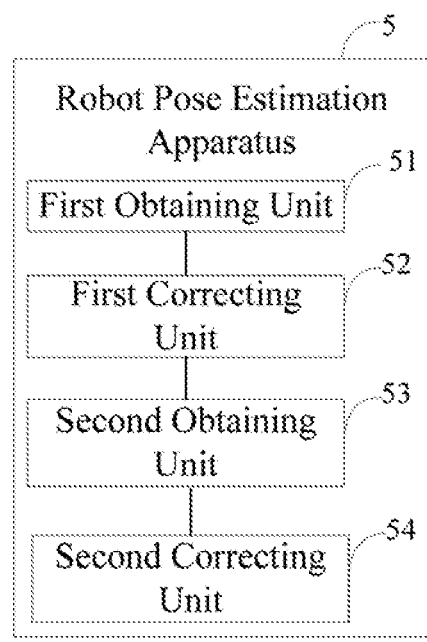
FIG. 5 is a schematic block diagram of a robot pose estimation apparatus according to an embodiment of the present disclosure.

FIG. 5 is a schematic block diagram of a robot pose estimation apparatus according to an embodiment of the present disclosure. In this embodiment, a robot pose estimation apparatus 5 for a robot having an inertial measurement unit (IMU), an auxiliary sensor, and a 2D lidar sensor is provided. The robot pose estimation apparatus 5 can be applied to a robot shown in FIG. 6 or be the robot itself. As shown in FIG. 5, the robot pose estimation apparatus 5 of the present embodiment includes a first obtaining unit 51, a first correcting unit 52, a second obtaining unit 53, and a second correcting unit 54.

the first obtaining unit 51 is configured to obtain, through the inertial measurement unit, initial 6DoF pose data;

the first correcting unit 52 is configured to obtain, through the auxiliary sensor, pose data, and perform a first correction on the initial 6DoF pose data based on the pose data obtained through the auxiliary sensor to obtain corrected 6DoF pose data;

the second obtaining unit 53 is configured to obtain, through the 2D lidar sensor disposed on a stable platform, 3DoF pose data; and the second correcting unit 54 is configured to perform a second correction on the corrected 6DoF pose data based on the 3DoF pose data to obtain target 6DoF pose data.

In one embodiment, the first correcting unit 52 is configured to:

decouple the initial 6DoF pose data to obtain pose data in a horizontal direction, pose data in a height direction, and a yaw angle; and correct the pose data in the horizontal direction, the pose data in the height direction, and the yaw angle based on the pose data obtained through the auxiliary sensor to obtain the corrected 6DoF pose data.

In one embodiment, the second obtaining unit 53 is configured to:

align two frames of data obtained at a current time and a previous time, and estimating a change amount of the 3DoF pose data between the two frames of data; and correct the 3DoF pose data obtained through the 2D lidar at the previous time based on the change amount to obtain the 3DoF pose data obtained through the 2D lidar sensor at the current time.

In one embodiment, the second correcting unit 54 is configured to:

use the following correction equation to perform the second correction on the corrected 6DoF pose data:

$$(P^+)^{-1}=(1-\omega)P^{-1}+\omega \cdot C^T R^{-1} C$$

$$\hat{x}^+=P^+((1-\omega)P^{-1}\hat{x}+\omega \cdot C^T R^{-1}\xi^+)^{-1};$$

where, $\hat{x}$ is the corrected 6DoF pose data, P is a variance matrix corresponding to the corrected 6DoF pose data, and $\xi^+$ is the 3DoF pose data, R is a variance matrix corresponding to the corrected 3DoF pose data, C is an observation projection matrix for projecting the corrected 6DoF pose data $\hat{x}$ onto a scan plane of the 2D lidar sensor, and $\omega$ is a correction weight.

In one embodiment, the robot pose estimation apparatus 5 further includes a platform control unit configured to calculate a control amount of the stable platform based on the corrected 6DoF pose data, and control an actuator to drive the stable platform to move in a reverse direction according to the control amount to keep the stable platform stable.

In this embodiment, each of the above-mentioned units is implemented in the form of software, which can be computer program(s) stored in a memory of the robot pose estimation apparatus 5 and executable on a processor of the robot pose estimation apparatus 5. In other embodiments, each of the above-mentioned units may be implemented in the form of hardware (e.g., a circuit of the robot pose estimation apparatus 5 which is coupled to the processor of the robot pose estimation apparatus 5) or a combination of hardware and software (e.g., a circuit with a single chip microcomputer).

Figure 6:
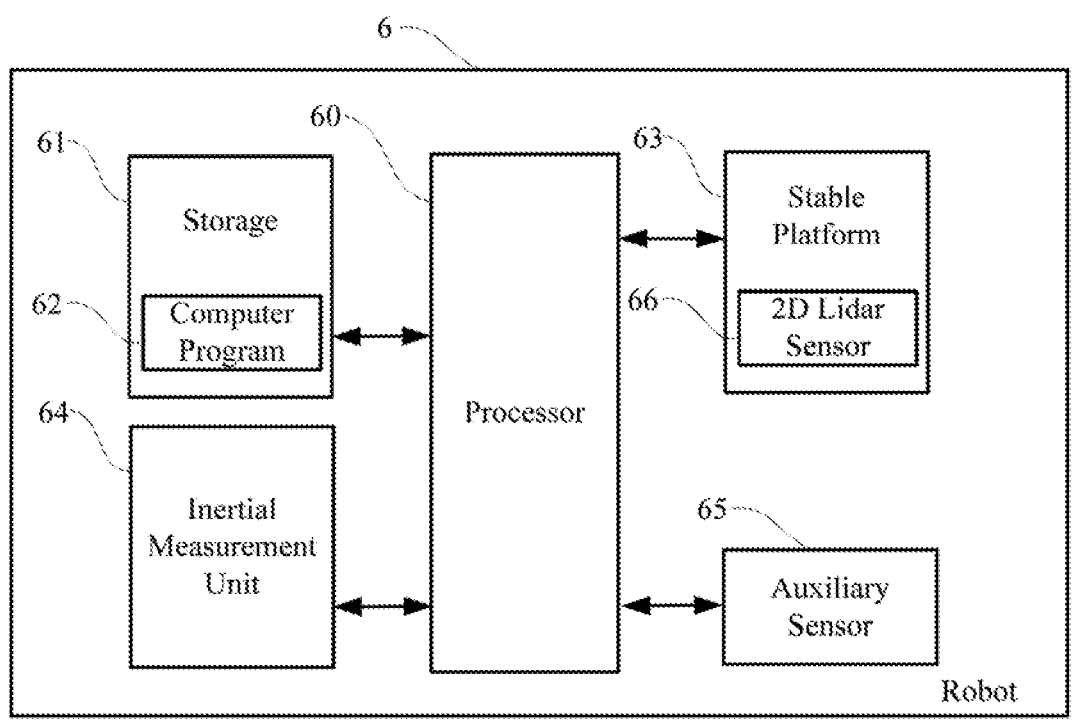
FIG. 6 is a schematic block diagram of a robot according to an embodiment of the present disclosure.

FIG. 6 is a schematic block diagram of a robot according to an embodiment of the present disclosure. As shown in FIG. 6, in this embodiment, the robot 6 includes a processor 60, a storage 61, a computer program 62 stored in the storage 61 and executable on the processor 60, for example, a robot pose estimation program, a stable platform 63, an inertial measurement unit 64, an auxiliary sensor 65, and a 2D lidar sensor 66 disposed on the stable platform 63. When executing (instructions in) the computer program 62, the processor 60 implements the steps in the above-mentioned embodiments of the robot pose estimation method, for example, steps 101-104 shown in FIG. 1. Alternatively, when the processor 60 executes the (instructions in) computer program 62, the functions of each module/unit in the above-mentioned device embodiments, for example, the functions of the units 51-54 shown in FIG. 5 are implemented.

Exemplarily, the computer program 62 may be divided into one or more modules/units, and the one or more modules/units are stored in the storage 61 and executed by the processor 60 to realize the present disclosure. The one or more modules/units may be a series of computer program instruction sections capable of performing a specific function, and the instruction sections are for describing the execution process of the computer program 62 in the robot 6. For example, computer program 62 can be divided into a first obtaining unit, a first correcting unit, a second obtaining unit, and a second correcting unit. The function of each unit is as follows:

the first obtaining unit is configured to obtain, through the inertial measurement unit, initial 6DoF pose data;

the first correcting unit is configured to obtain, through the auxiliary sensor, pose data, and perform a first correction on the initial 6DoF pose data based on the pose data obtained through the auxiliary sensor to obtain corrected 6DoF pose data;

the second obtaining unit is configured to obtain, through the 2D lidar sensor disposed on a stable platform, 3DoF pose data; an the second correcting unit is configured to perform a second correction on the corrected 6DoF pose data based on the 3DoF pose data to obtain target 6DoF pose data.

The robot 6 may include, but is not limited to, a processor 60 and a storage 61. It can be understood by those skilled in the art that FIG. 6 is merely an example of the robot 6 and does not constitute a limitation on the robot 6, and may include more or fewer components than those shown in the figure, or a combination of some components or different components. For example, the robot 6 may further include an input/output device, a network access device, a bus, and the like.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 61 may be an internal storage unit of the robot 6, for example, a hard disk or a memory of the robot 6. The storage 61 may also be an external storage device of the robot 6, for example, a plug-in hard disk, a smart media card (SMC), a secure digital (SD) card, flash card, and the like, which is equipped on the robot 6. Furthermore, the storage 61 may further include both an internal storage unit and an external storage device, of the robot 6. The storage 61 is configured to store the computer program 62 and other programs and data required by the robot 6. The storage 61 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed.

In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented pose estimation method for a robot having an inertial measurement unit, an auxiliary sensor, and a 2D lidar sensor, comprising executing on a processor of the robot steps of:
   obtaining, through the inertial measurement unit, initial 6DoF pose data;
   obtaining, through the auxiliary sensor, pose data;
   performing a first correction on the initial 6DoF pose data based on the pose data obtained through the auxiliary sensor to obtain corrected 6DoF pose data;
   obtaining, through the 2D lidar sensor, 3DoF pose data; and
   performing a second correction on the corrected 6DoF pose data based on the 3DoF pose data to obtain target 6DoF pose data.

2. The method of claim 1, wherein the step of performing the first correction on the initial 6DoF pose data based on the pose data obtained through the auxiliary sensor to obtain the corrected 6DoF pose data comprises:
   decoupling the initial 6DoF pose data to obtain pose data in a horizontal direction, pose data in a height direction, and a yaw angle; and
   correcting the pose data in the horizontal direction, the pose data in the height direction, and the yaw angle based on the pose data obtained through the auxiliary sensor to obtain the corrected 6DoF pose data.

3. The method of claim 2, wherein before the step of decoupling the initial 6DoF pose data further comprises:
   converting an angular velocity $\omega=(\omega_x,\omega_y,\omega_z)^T$ and an acceleration $a=(a_x,a_y,a_z)^T$ detected by the IMU in a body coordinate into an Euler angle $\Omega=(\phi, \theta, \varphi)^T$, a position vector $p=(p_x,p_y,p_z)^T$, and a velocity vector $\dot{p}=(\dot{p}_x, \dot{p}_y, \dot{p}_z)^T$ in a navigation system; and
   integrating the Euler angle $\Omega=(\phi, \theta,\varphi)^T$, the position vector $p=(p_x,p_y,p_z)^T$, and the velocity vector $\dot{p}=(\dot{p}_x, \dot{p}_y, \dot{p}_z)^T$ to obtain the initial 6DoF pose data.

4. The method of claim 1, wherein the step of obtaining, through the 2D lidar sensor, the 3DoF pose data comprises:
aligning two frames of data obtained at a current time and a previous time, and estimating a change amount of the 3DoF pose data between the two frames of data; and
correcting the 3DoF pose data obtained through the 2D lidar at the previous time based on the change amount to obtain the 3DoF pose data obtained through the 2D lidar sensor at the current time.

5. The method of claim 1, wherein the step of performing the second correction on the corrected 6DoF pose data based on the 3DoF pose data to obtain the target 6DoF pose data comprises:
using the following correction equation to perform the second correction on the corrected 6DoF pose data:

$$(P^+)^{-1}=(1-\omega)P^{-1}+\omega \cdot C^T R^{-1} C$$

$$\hat{x}^+=P^+((1-\omega)P^{-1}\hat{x}+\omega \cdot C^T R^{-1}\xi^+)^{-1};$$

where, $\hat{x}$ is the corrected 6DoF pose data, P is a variance matrix corresponding to the corrected 6DoF pose data, and $\xi^+$ is the 3DoF pose data, R is a variance matrix corresponding to the corrected 3DoF pose data, C is an observation projection matrix for projecting the corrected 6DoF pose data onto a scan plane of the 2D lidar sensor, and $\omega$ is a correction weight.

6. The method of claim 1, wherein the robot further comprises a stable platform, the 2D lidar sensor is disposed on the stable platform, and the step of obtaining, through the 2D lidar sensor, the 3DoF pose data comprises:
obtaining, through the 2D lidar sensor disposed on the stable platform, the 3DoF pose data.

7. The method of claim 6, further comprising:
calculating a control amount of the stable platform based on the corrected 6DoF pose data, and controlling an actuator to drive the stable platform to move in a reverse direction according to the control amount to keep the stable platform stable.

8. A pose estimation apparatus for a robot having an inertial measurement unit, an auxiliary sensor, and a 2D lidar sensor, comprising:
a first obtaining unit configured to obtain, through the inertial measurement unit, initial 6DoF pose data;
a first correcting unit configured to obtain, through the auxiliary sensor, pose data, and perform a first correction on the initial 6DoF pose data based on the pose data obtained through the auxiliary sensor to obtain corrected 6DoF pose data;
a second obtaining unit configured to obtain, through the 2D lidar sensor, 3DoF pose data; and
a second correcting unit configured to perform a second correction on the corrected 6DoF pose data based on the 3DoF pose data to obtain target 6DoF pose data.

9. The apparatus of claim 8, wherein the first correcting unit is configured to:
decouple the initial 6DoF pose data to obtain pose data in a horizontal direction, pose data in a height direction, and a yaw angle; and
correct the pose data in the horizontal direction, the pose data in the height direction, and the yaw angle based on the pose data obtained through the auxiliary sensor to obtain the corrected 6DoF pose data.

10. The apparatus of claim 8, wherein the second obtaining unit is configured to:
align two frames of data obtained at a current time and a previous time, and estimating a change amount of the 3DoF pose data between the two frames of data; and
correct the 3DoF pose data obtained through the 2D lidar at the previous time based on the change amount to obtain the 3DoF pose data obtained through the 2D lidar sensor at the current time.

11. The apparatus of claim 8, wherein the second correcting unit is configured to:
use the following correction equation to perform the second correction on the corrected 6DoF pose data:

$$(P^+)^{-1}=(1-\omega)P^{-1}+\omega \cdot C^T R^{-1} C$$

$$\hat{x}^+=P^+((1-\omega)P^{-1}\hat{x}+\omega \cdot C^T R^{-1}\xi^+)^{-1};$$

where, $\hat{x}$ is the corrected 6DoF pose data, P is a variance matrix corresponding to the corrected 6DoF pose data, and $\xi^+$ is the 3DoF pose data, R is a variance matrix corresponding to the corrected 3DoF pose data, C is an observation projection matrix for projecting the corrected 6DoF pose data onto a scan plane of the 2D lidar sensor, and $\omega$ is a correction weight.

12. The apparatus of claim 8, wherein the robot further comprises a stable platform, the 2D lidar sensor is disposed on the stable platform, and the method further comprises:
a platform control unit configured to calculate a control amount of the stable platform based on the corrected 6DoF pose data, and control an actuator to drive the stable platform to move in a reverse direction according to the control amount to keep the stable platform stable.

13. A robot, comprising:
an inertial measurement unit;
an auxiliary sensor;
a 2D lidar sensor;
a memory;
a processor; and
one or more computer programs stored in the memory and executable on the processor, wherein the one or more computer programs comprise:
instructions for obtaining, through the inertial measurement unit, initial 6DoF pose data;
instructions for obtaining, through the auxiliary sensor, pose data;
instructions for performing a first correction on the initial 6DoF pose data based on the pose data obtained through the auxiliary sensor to obtain corrected 6DoF pose data;
instructions for obtaining, through the 2D lidar sensor, 3DoF pose data; and
instructions for performing a second correction on the corrected 6DoF pose data based on the 3DoF pose data to obtain target 6DoF pose data.

14. The robot of claim 13, wherein the instructions for performing the first correction on the initial 6DoF pose data based on the pose data obtained through the auxiliary sensor to obtain the corrected 6DoF pose data comprise:
instructions for decoupling the initial 6DoF pose data to obtain pose data in a horizontal direction, pose data in a height direction, and a yaw angle; and
instructions for correcting the pose data in the horizontal direction, the pose data in the height direction, and the yaw angle based on the pose data obtained through the auxiliary sensor to obtain the corrected 6DoF pose data.

15. The robot of claim 14, wherein the one or more computer programs further comprise:
instructions for converting an angular velocity $\omega=(\Omega_x, \omega_y, \omega_z)^T$ and an acceleration $a=(a_x,a_y,a_z)^T$ detected by the IMU in a body coordinate into an Euler angle $\Omega=(\phi,\theta,\varphi)^T$, a position vector $p=(p_x,p_y,p_z)^T$, and a velocity vector $\dot{p}=(\dot{p}_x,\dot{p}_y,\dot{p}_z)^T$ in a navigation system; and instructions for integrating the Euler angle $\Omega=(\phi, \theta, \varphi)^T$, the position vector $p=(p_x, p_y, p_z)^T$, and the velocity vector $\dot{p}=(\dot{p}_x,\dot{p}_y, \dot{p}_z)^T$ to obtain the initial 6DoF pose data.

16. The robot of claim 13, wherein the instructions for obtaining, through the 2D lidar sensor, the 3DoF pose data comprise:

instructions for aligning two frames of data obtained at a current time and a previous time, and estimating a change amount of the 3DoF pose data between the two frames of data; and instructions for correcting the 3DoF pose data obtained through the 2D lidar at the previous time based on the change amount to obtain the 3DoF pose data obtained through the 2D lidar sensor at the current time.

17. The robot of claim 13, wherein the instructions for performing the second correction on the corrected 6DoF pose data based on the 3DoF pose data to obtain the target 6DoF pose data comprise:

instructions for using the following correction equation to perform the second correction on the corrected 6DoF pose data:

$$(P^+)^{-1}=(1-\omega)P^{-1}+\omega \cdot C^T R^{-1} C$$

$$\hat{x}^+=P^+((1-\omega)P^{-1}\hat{x}+\omega \cdot C^T R^{-1}\xi^+)^{-1};$$

where, $\hat{x}$ is the corrected 6DoF pose data, P is a variance matrix corresponding to the corrected 6DoF pose data, and $\xi^+$ is the 3DoF pose data, R is a variance matrix corresponding to the corrected 3DoF pose data, C is an observation projection matrix for projecting the corrected 6DoF pose data onto a scan plane of the 2D lidar sensor, and $\omega$ is a correction weight.

18. The robot of claim 13, wherein the robot further comprises a stable platform, the 2D lidar sensor is disposed on the stable platform, and the instructions for obtaining, through the 2D lidar sensor, the 3DoF pose data comprise:

instructions for obtaining, through the 2D lidar sensor disposed on the stable platform, the 3DoF pose data.

19. The robot of claim 13, wherein the one or more computer programs further comprise:

instructions for calculating a control amount of the stable platform based on the corrected 6DoF pose data, and controlling an actuator to drive the stable platform to move in a reverse direction according to the control amount to keep the stable platform stable.

* * * * *